Feb. 16, 1937.  E. J. HUBELMEYER  2,071,123

MACHINE FOR CUTTING, FOLDING, AND STACKING LABELS

Filed Jan. 14, 1935  7 Sheets—Sheet 1

INVENTOR
Edward J. Hubelmeyer
BY
Marshall & Hawley.
ATTORNEYS

Feb. 16, 1937.  E. J. HUBELMEYER  2,071,123
MACHINE FOR CUTTING, FOLDING, AND STACKING LABELS
Filed Jan. 14, 1935  7 Sheets-Sheet 4

INVENTOR
Edward J. Hubelmeyer
BY
Marshall & Hawley.
ATTORNEYS

Feb. 16, 1937. E. J. HUBELMEYER 2,071,123
MACHINE FOR CUTTING, FOLDING, AND STACKING LABELS
Filed Jan. 14, 1935  7 Sheets-Sheet 7

INVENTOR
Edward J. Hubelmeyer
BY
Marshall & Hawley
ATTORNEYS

Patented Feb. 16, 1937

2,071,123

UNITED STATES PATENT OFFICE 2,071,123

MACHINE FOR CUTTING, FOLDING, AND STACKING LABELS

Edward J. Hubelmeyer, Little Ferry, N. J., assignor to J & H Machine Works, Little Ferry, N. J., a corporation of New Jersey Application January 14, 1935, Serial No. 1,672

19 Claims.  (Cl. 271—85)

This invention relates to a machine for cutting, folding and stacking labels.

More particularly stated, the invention relates to a machine for cutting labels of cloth or fabric from a label strip, folding the ends of the labels and stacking the folded labels.

Such labels have woven therein or printed thereon indicia or identifying marks indicating the trade name of the article on which they are to be used or the name of the maker or retailer. It is obvious that such woven or printed matter must be properly centered on the label and to accomplish this the label must be accurately fed, cut and folded.

When the labels are folded in the usual folding machine they are disposed in inverted position or upside down and they are usually stacked, if at all, in this position.

This invention has for one of its objects to provide means in conjunction with a label feeding, cutting and folding machine for accurately stacking the labels "right side up".

Another object of the invention is to provide stacking mechanism for labels so constructed and arranged that it can be adapted for use with labels of different sizes and will accurately position and stack the labels and hold them in stacked position.

Further objects of the invention will appear from the following specification taken in connection with the drawings which form a part of this application, and in which.

The invention briefly described consists of a machine comprising means for feeding a label strip, means for cutting the strip into separate labels, means for folding the ends of the labels, means for shifting the labels from the folding means to presser means and label transfer and stacking mechanism arranged to engage the labels in the presser means or on the support to which they are transferred from the folding mechanism and positioning the labels in a box or container. The transfer mechanism more specifically stated, comprises a pair of transfer fingers and means for positioning one finger beneath a label on the support or disposed between the pressing means and for positioning the other finger in engagement with the top of the label, the transfer means then being moved in unison to position the label in the container or box. The label gripping fingers of the transfer mechanism are so mounted that when the label is moved from the support or pressing means to the container it will be inverted, thus stacking the labels right side up.

Further details of the invention will appear from the following description.

Figure 1:
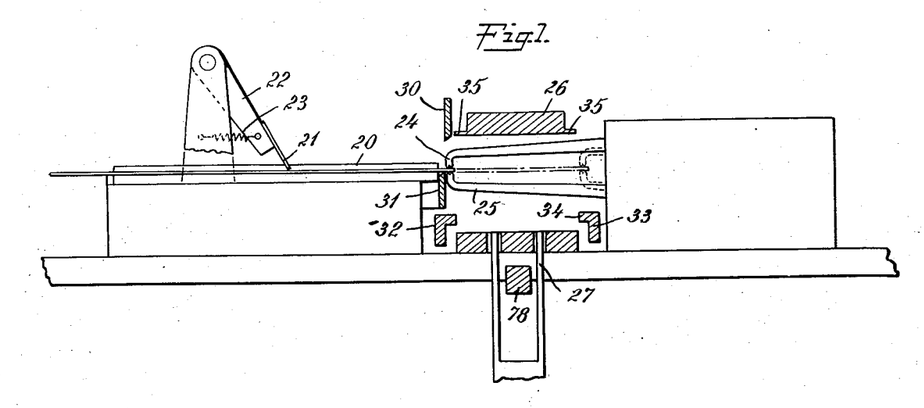
Fig. 1 is a sectional elevation somewhat diagrammatic showing the strip feeding mechanism at the initial stage of the feeding operation.
Figure 2:
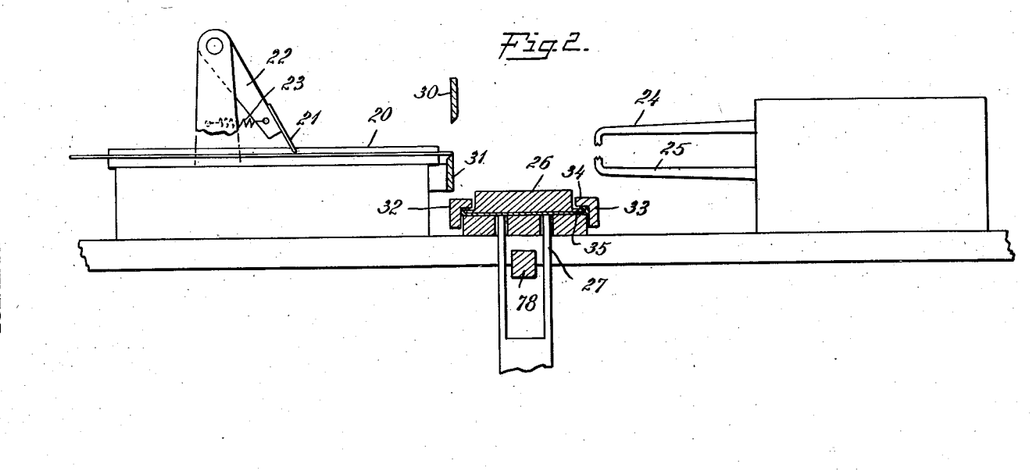
Fig. 2 is a view similar to Fig. 1 showing the severed strip disposed between clamping members and with the ends folded over.

Since no novelty is claimed in this application for the feeding, cutting and folding mechanism, this mechanism has not been illustrated in detail. As shown somewhat diagrammatically in Figs. 1 and 2, the label feeding mechanism consists of a reciprocatable slide 20, a blade 21 carried by a pivoted arm 22 and actuated by a spring 23 into engagement with the upper surface of a label strip and a pair of grippers 24 and 25 arranged to engage the advance end of the label strip, as shown in Fig. 1, and to pull the strip forwardly to the position shown in dotted lines in Fig. 1. The slide 20 and blade 21 are carried by the same reciprocating parts and move in unison a sufficient distance to feed the advance end of the label into the position shown in Fig. 1 where it can be gripped by the grippers 24 and 25. The grippers, as above stated, then pull the label forwardly one label length.

After the label has been pulled forwardly by the grippers it is engaged by a pair of clamping members including an upper member 26 and a lower member 27. The upper member moves downwardly from the position shown in Fig. 1 and the lower member moves upwardly to clamp the label length which has been fed forwardly. Thereupon the length is severed by a pair of shear blades 30 and 31 and the severed label is then moved downwardly past a pair of end folders 32 and 33. During this movement the ends of the label are folded upwardly by engagement with the inner ends 34 of the folders 32 and 33. The folders then move toward each other to the position shown in Fig. 2, folding the ends of the label over flanges 35 formed on the upper clamp member 26.

After the label has been fed, cut and folded in the manner above described it is discharged from the clamping members by means of a reciprocatable label feeding member 40. This member consists of a plate having its ends bent back or folded in a manner similar to the ends of the label. The plate is reciprocatable on guides 41 and is slidable over the clamping member 26 after the members 26 and 27 have been separated to a sufficient extent to allow the transfer plate or label feeding member to move between the clamping members.

The parts above described are carried by a machine frame comprising a base 45, side walls 46 and a top or table 47.

The mechanism for operating the various parts is driven from a shaft 50 on which are mounted a plurality of cams constructed and arranged to operate levers in a manner hereinafter described, the levers being connected to the various operative parts of the machine.

The label is discharged from the upper clamp member 26 by the feeding member 40 to a position between a support 51 and a pair of presser members 52 and 53 which are preferably heated in any suitable manner, as by heating coils 54. This structure is particularly illustrated in Fig. 9. It should be noted that the support 51 has a longitudinal groove 55 in its upper surface, thus permitting one of the transfer fingers to move beneath a label positioned on the support in a manner hereinafter set forth.

*Clamp operating means*

Figure 3:
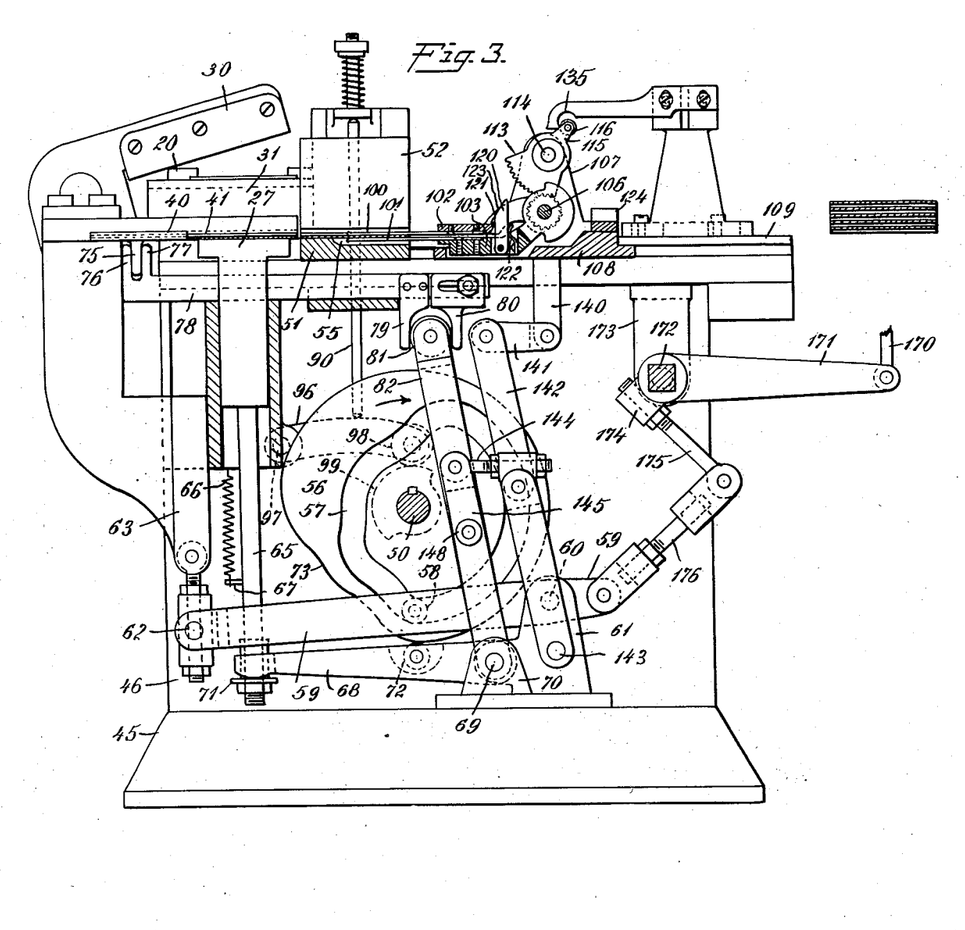
Fig. 3 is a vertical sectional elevation of the machine showing the folded strip disposed between presser members and just prior to the operation of the label transfer and stacking mechanism.

As shown in Fig. 3, a cam 56 is mounted on the shaft 50 and has a cam groove 57 in which is positioned a roller 58 carried by a lever 59 mounted on a fixed pivot 60 in pivot lugs 61. The lever 59 is connected at 62 to a vertically movable plunger 63 which is connected to the upper clamp member 26.

The bottom clamp 27 is carried by a vertically reciprocatable plunger 65 which is actuated in an upward direction by a spring 66 connected at one end to a fixed abutment and at the other end at 67 to the plunger. The plunger 65 is engaged at its lower end by a lever 68 mounted on a fixed pivot 69 carried by lugs 70. The free end of the arm 68 is bifurcated and engages a washer or collar 71 which is adjustably mounted on the lower end of the rod or plunger 65. The arm 68 carries a roller 72 which is held in engagement with a cam 73 by the spring 66. As the cam is rotated by the shaft 50 the arm 68 will be swung on its pivot and will reciprocate the lower clamp in the manner described in connection with the description of the structure shown in Figs. 1 and 2.

*Operating connections for label feeding means which feeds the folded label from the member 26 to the label pressing means*

Figure 9:
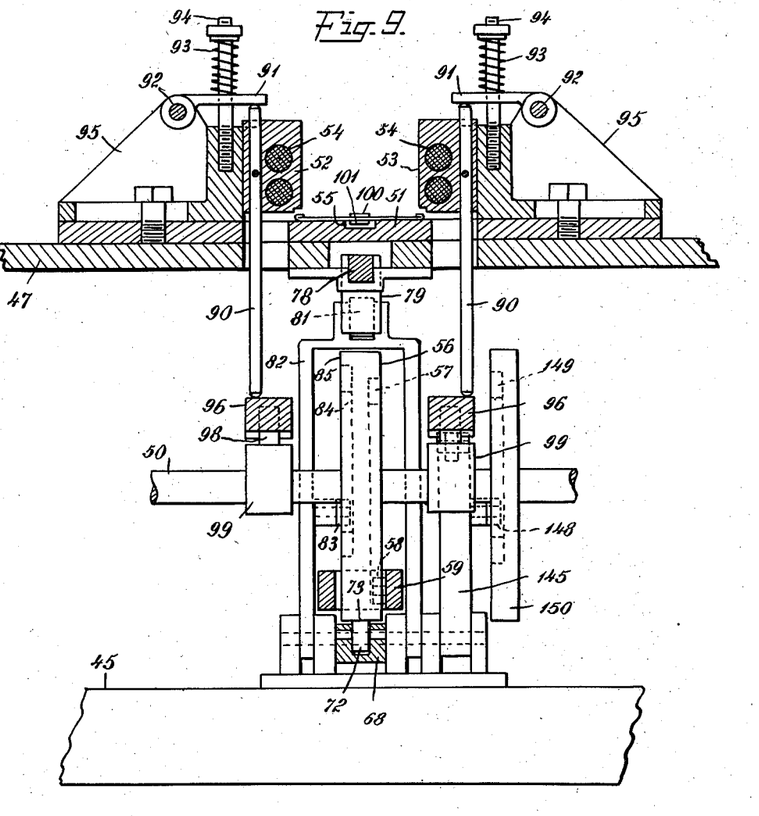
Fig. 9 is a vertical sectional elevation through the pressing means showing the cams for operating the various parts of the mechanism.

The plate 40 has connected thereto and extending downwardly therefrom a lug 75 which is disposed between upwardly extending lugs 76 and 77 carried by a rod 78. The rod 78 has a downwardly extending lug 79 fixedly secured thereto and a downwardly extending lug 80 adjustably secured thereto in the manner shown in Fig. 3. Between the lugs 79 and 80 is positioned a roller 81 carried by the upper end of a lever 82 which is pivotally mounted on the pivot 69 above mentioned. The arm 82 is bifurcated or U-shaped, as shown in Fig. 9, and has secured thereto a roller 83 which is positioned in a cam groove 84 of a cam 85 carried by the shaft 50. As the cam rotates the arm or lever 82 will be oscillated at the proper period in the cycle of operation of the machine to discharge the folded label from the clamp member 26 to the pressing means. The amount of movement of the rod 78 and the label discharge member carried thereby is controlled by the adjustment of the lug 80 on the rod 78. This feeding movement is varied to suit labels of different widths.

*Operating connections for label pressing members*

Figure 4:
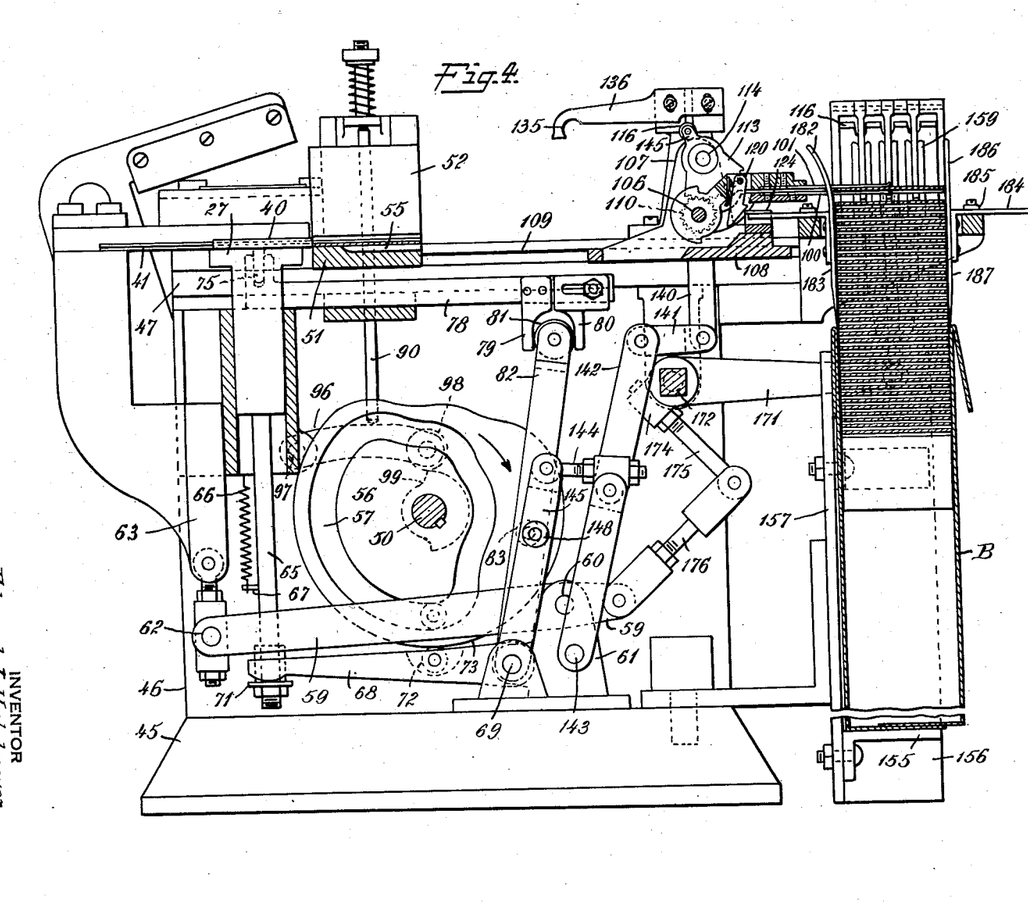
Fig. 4 is a vertical sectional elevation similar to Fig. 3 showing the label transfer mechanism at the end of its stacking movement.
Figures 8, 13:
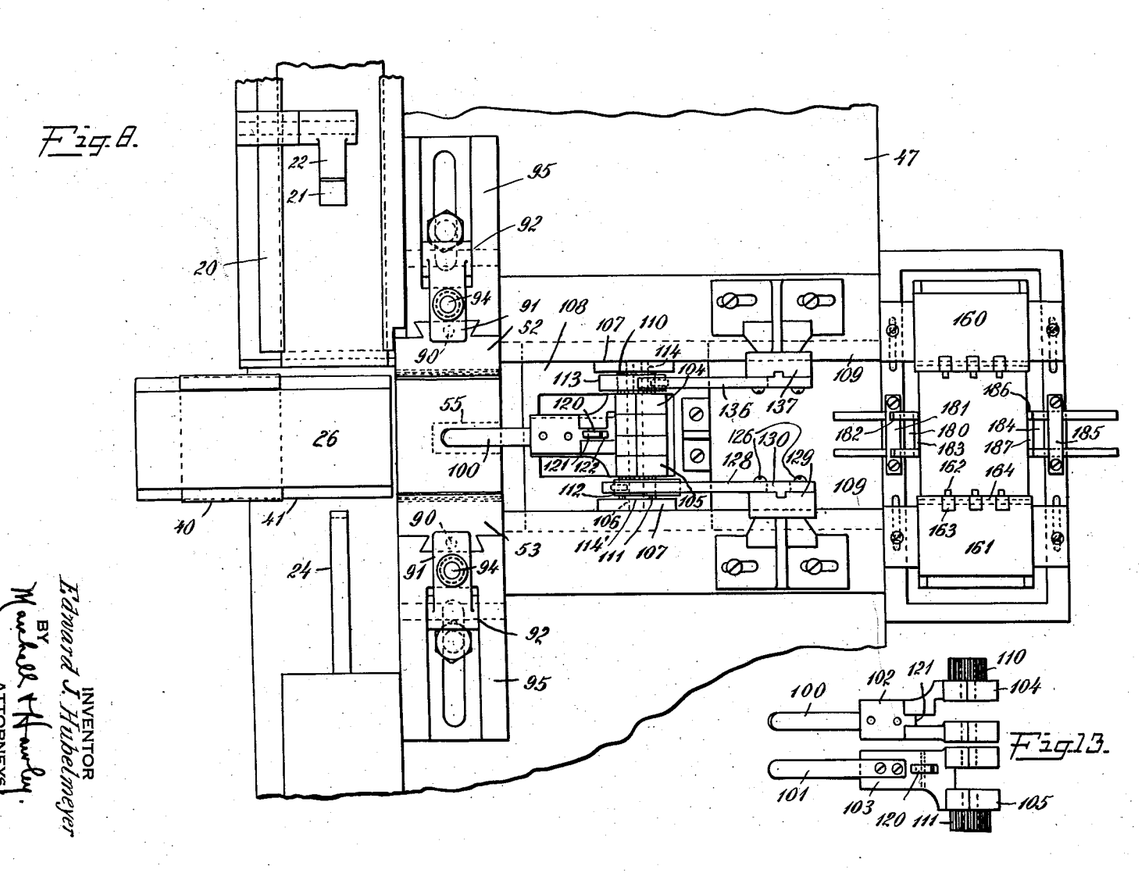
Fig. 8 is a top plan view of the machine, the transfer mechanism being shown in its initial position or prior to the transfer and stacking movement thereof.
Fig. 13 is a detail elevational view showing the mounting of the pivoted fingers of the label transfer mechanism which transfers the labels from the presser means to the stack and stacking mechanism.

This mechanism is particularly illustrated in Figs. 4 and 9. Each of the pressing members 52 and 53 has secured thereto and extending downwardly therefrom a vertical rod 90, the upper ends of the rods extending above the members 52 and 53 and being engaged by arms 91 which are mounted on fixed pivots 92 and are pressed downwardly by springs 93 carried by vertical posts 94. The pivots 92 and posts 94 are carried by brackets 95 which are adjustably mounted on the table 47, as shown in Fig. 9, and can be moved toward or away from each other to accommodate labels of different lengths. These brackets form the guides for the vertically reciprocatable presser members 52 and 53. As shown in Fig. 8, the brackets 95 and the presser members 52 and 53 are connected by dove tail connections. The rods 90 engage at their lower ends levers 96 mounted on fixed pivots 97 and provided at their free ends with rollers 98 which are disposed in engagement with cams 99 mounted on a shaft 50.

At the proper time in the period of operation of the machine the presser members are raised by the cams 99 acting through the rods 90 to permit the folded label to be fed to a position between the support 51 and the presser members 52 and 53. When the label has been so positioned the cam 99 will permit the rods 90 to be lowered under the action of the springs 93, thus permitting the presser members 52 and 53 to engage the folded ends of the label.

*Label transfer and stacking mechanism*

The label transfer mechanism for transferring the labels from the support 51 or from a position between the presser members to the stack or container consists primarily of a pair of transfer fingers 100 and 101. These fingers are carried by arms 102 and 103 which in turn are connected to hubs 104 and 105 pivotally mounted on a spindle 106 carried by lugs 107 which extend upwardly from and are connected to a reciprocatable carriage 108. The carriage is slidably mounted in guides 109 supported on the table 47. The hubs 104 and 105 are bifurcated, as shown in Fig. 13, and are so mounted on the spindle that the bifurcated portions thereof are positioned in alternate relation on the spindle, as shown in Fig. 8 and the arms 102 and 103 are disposed in registration or alinement with each other. The fingers 100 and 101 are also positioned in the same vertical plane and when gripping and feeding a label are disposed one above the other. These details are clearly illustrated in Fig. 8.

The hubs 104 and 105 have secured thereto spur gears 110 and 111 which are engaged by toothed quadrants or sectors 112 and 113 which are pivotally mounted on stub shafts 114 and 114' carried by the lugs 107. Each quadrant or sector 112, 113 acts as a lever and has upwardly extending lugs 115 between which are mounted rollers 116.

At certain periods in the cycle of operation of the fingers 100 and 101 these fingers are locked together and move in unison. This is accomplished by a latch 120 carried by the arm 103 and engageable over the edge 121 of the arm 102. (See Fig. 3.) The latch is spring actuated by a spring 122 and has a beveled or inclined upper edge 123. When the fingers are swung to discharge position, as shown in Fig. 4, the beveled edge 123 of the latch engages an abutment 124, thus releasing the latch.

The pivotal movement of the fingers 100 and 101 is controlled by the toothed quadrants or sectors 112 and 113. The movement of the quadrants is in turn controlled by stationary cams which are engaged by the rollers 116 carried by the quadrants and cause the quadrants to be swung on their pivots during the reciprocation of the carriage 108. Since the quadrants are geared to the gears 110 and 111 it will be obvious that the oscillation of the quadrants will cause the fingers to swing on their axis or on the spindle 106. The quadrant 112 is controlled by a fixed cam 128 which is carried by a bracket 129 secured to the table 47 and adjustably secured by screws 126, as shown in Fig. 8. The cam 128 has a horizontal guiding surface 128' and a cam notch 130 at its forward end.

Figure 5:
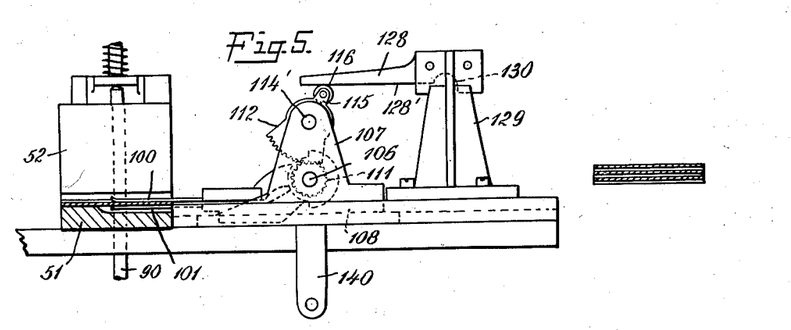
Figs. 5, 6 and 7 are detail sectional elevations illustrating the operation of the label transfer and stacking fingers, the parts being shown in three positions of movement.

During the forward movement of the carriage 108 and of the transfer fingers carried thereby the fingers will move in unison in a horizontal direction during the engagement of the roller 116 with the surface 128' of the cam 128. However, when the roller 116 enters the cam notch 130 and engages the advance wall of this notch the quadrant 112 will be swung on its pivot in a counterclockwise direction viewing Fig. 5 causing the arm 103 to swing in a clockwise direction. At this point in the operation of the machine the two arms are locked together by the latch 120 and will be swung in unison about the axis of the spindle 106 from the position shown in Fig. 3 to the position shown in Fig. 4. When the fingers reach the latter position the latch 120 will be released.

Figure 6:
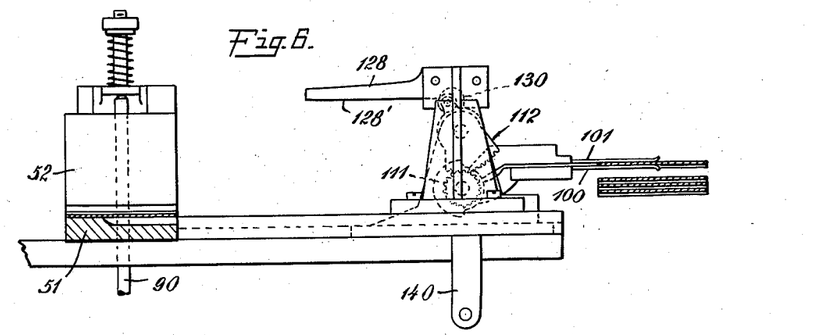

The carriage 108 thereupon starts its rearward movement and the roller 116 carried by the quadrant 112 will engage the opposite side of the cam notch 130 swinging the quadrant in a clockwise direction whereupon the arm 103 will be swung in an anticlockwise direction away from the arm 102. The arm 103 will be swung on its pivot to horizontal position and as the carriage moves to the left viewing Figs. 5, 6 and 7 the finger 101 will be moved into the groove 55 in the support 51.

Figure 7:
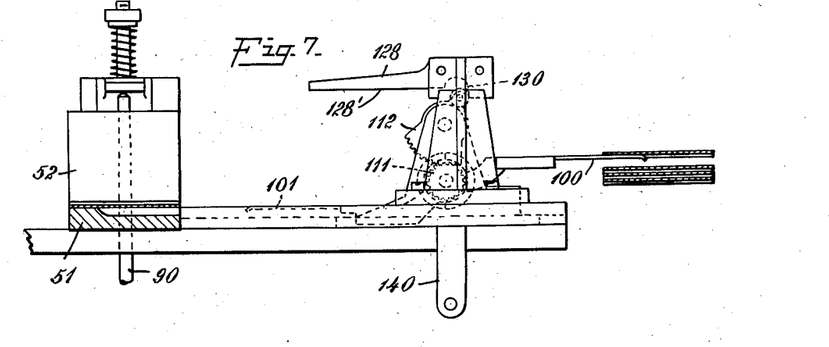

During the foregoing movement of the arm 103 and finger 101 the arm 102 and finger 100 will be maintained in the horizontal position shown in Fig. 7 until the roller 116 carried by the quadrant 113 engages a cam 135 formed on the end of an arm 136 which is carried by a bracket 137 corresponding with the bracket 129. The arms 128 and 136 are parallel. It will be noted that the undersurface of the arm 136 is horizontal and the roller 116 on the quadrant 113 will travel along on the undersurface of the arm until it engages the cam 135. When this takes place, the quadrant 113 will be rotated in a clockwise direction swinging the arm 102 in an anticlockwise direction about the axis of the shaft 106. The finger 100 which is carried by the arm 102 will thus be swung downwardly onto the top of the label beneath which is disposed the finger 101. The latch 120 will snap into place holding these parts in the position shown in Fig. 3 and in latched position to move in unison until the fingers are swung through substantially 180° to position the label carried thereby in the box B which is supported in position to receive the labels.

The cams 130 and 135 on the stationary members 128 and 136 operate in conjunction with the rollers 116 to swing the quadrants about their pivots and thus to swing the transfer fingers at a rapid rate at the two extremes of movement of the reciprocating carriage 108.

Summarizing the foregoing operation of the transfer fingers, the fingers will be latched in gripping engagement with a label and will swing the label through 180° to discharge position. Thereupon the reciprocation of the carriage in the opposite direction will immediately withdraw the finger 101 which is now disposed on top of the label and will swing that finger through its complete swinging movement to horizontal position and the finger 101 will move into the groove 55 of the support 51. The finger 100, however, will be withdrawn horizontally from beneath a label which has been positioned on the stack and will move with the carriage parallel to the path of movement of the carriage until it has reached approximately the limit of movement of the carriage in the opposite direction whereupon this finger will swing downwardly to engage the top of the label next to be transferred.

*Carriage reciprocating mechanism*

This mechanism is particularly illustrated in Figs. 3, 4, 9 and 12. The lug 140 is secured to and extends downwardly from the carriage 108 and is connected by a link 141 to a lever 142 mounted on a fixed pivot 143. The lever 142 is in turn adjustably connected by a link 144 to an arm 145 fixed to a spindle 146. Arm 145 carries a roller 148. This roller is disposed in a cam groove 149 of a cam 150 mounted on the shaft 50. As the cam 150 rotates the cam groove will cause the roller 148 to swing the arm 145 about the axis of the spindle 146. The link connection 144 between the arm 145 and the arm 142 will cause the arm 142 to be oscillated on its pivot 143 and thus, through the link 141 and lug 140 will cause the carriage 108 to reciprocate.

The box B is mounted on a support 155 fixed to the frame of the machine and disposed between guides 156 which are adjustably mounted on a frame member 157. This adjustment is provided to permit the use of boxes of different sizes depending on the length of the label folded.

Figure 10:
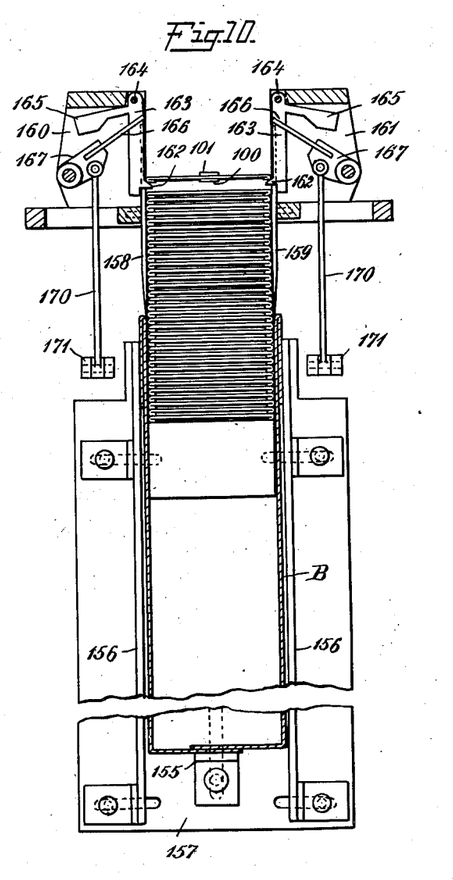
Fig. 10 is a vertical sectional elevation through the container in which the labels are stacked and the means for positioning the labels in the container after they have been transferred thereto by the transfer mechanism.
Figure 11:
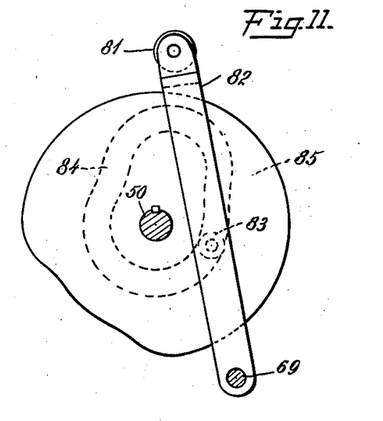
Fig. 11 is an elevational view somewhat diagrammatic showing the operating cam and lever for the label transfer means which transfers the labels from the folding mechanism to the presser means.
Figure 12:
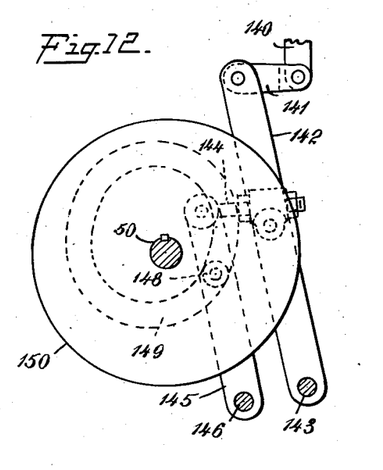
Fig. 12 is a view similar to Fig. 11 illustrating the operating and control mechanism for the label transfer mechanism.

The labels are deposited by the transfer fingers 100 and 101 between vertically disposed guides 158 and 159 carried by brackets 160 and 161. The guides 158 and 159 consist of a plurality of separate fingers forming combs between which project lugs 162 carried by arms 163 pivoted at 164 in the brackets 160 and 161. Weights 165 are secured to the arms 163 and normally hold the arms in the position shown in Fig. 10 in which the fingers 162 project between the comb teeth or vertical fingers which constitute the guides 158 and 159.

In order to position the labels beneath the lugs 162 and to press the labels downwardly in the box B there are provided a plurality of pins 166 which are carried by brackets 167 mounted on pivots 168 on the brackets 160 and 161. The fingers 166 project between the arms 163 and in their downward movement are positioned between the vertical fingers of the guides 158 and 159. The presser fingers 166 are actuated in the following manner: Each of the brackets 167 has connected thereto a downwardly extending link 170 which is connected at its lower end, as shown in Figs. 3 and 4, to an arm 171 mounted on a pivot 172 formed in a bracket 173. The arms 171 extend beyond the pivot 172 and have connected to an extension 174 thereof a link 175 which is connected to an adjustable link 176, the end of which is connected to the lever 59 which in a manner hereinbefore described controls the movement of the top clamp member 26.

By the foregoing operative connections the fingers 166 will engage the ends of each label as the label is positioned between the vertical guides 158 and 159 by the transfer fingers 100 and 101 and will press the label downwardly into the box B.

In addition to the guides 158 and 159 for receiving the labels guide members are provided for the other two edges of the labels. The rear edges of the labels are guided by a member 180 which is adjustably secured in a clamp 181 and has upwardly extending separated tines 182 and downwardly extending separated guide members or tines 183. The other edges are guided by similar guiding means comprising a member 184 adjustably mounted in a clamp 185 and having upwardly extending members 186 and downwardly extending members 187. The lower ends of the guiding members 158 and 159, 182 and 187 are positioned within the upper end of the box B.

It will be noted from the foregoing description all of the operative parts of the machine are made adjustable to accommodate the machine for use with labels of different lengths and widths. This statement applies to the strip feeding means, label discharge means for discharging the label from the clamps to the pressing means, to the pressing members 52 and 53, brackets for the stationary cams 128 and 135, guiding members for guiding the labels into the box and box holding and supporting means.

*Résumé of operation*

The operations of the various parts of the device have been explained in detail and are briefly summarized as follows: The label strip is first fed, cut and folded in the usual well known manner illustrated diagrammatically in Figs. 1 and 2.

The folded strip is then discharged by the label feeding or discharge plate 40 and is positioned between the support 51 and the vertically reciprocatable presser members 52 and 53. These members are moved downwardly to press the folded ends of the label and the label is then positioned between the fingers 100 and 101 and these fingers are swung in unison through substantially 180° to discharging position, above the box B. After a label has been moved to this position the finger 101 which is then disposed on top of the label is swung on its axis through its limited movement to horizontal position and as the carriage 108 is retracted the finger 101 will be positioned in the groove 55 of the support 51. The retractive movement of the carriage will cause the finger 101 to be swung by reason of the action of the cam 130 on the roller 116 carried by the quadrant 112. As the carriage approaches its initial position or the position shown in Fig. 3, the roller 116 on the quadrant 113 will engage the cam 135 which will cause the finger 100 to swing through substantially 180° to the position shown in Figs. 3 and 5 wherein the finger is shown as engaging the top of the label.

After each label is delivered by the transfer fingers in the manner described in the preceding paragraph the feeding fingers 166 will be actuated to press the label downwardly. During this movement the lugs 162 will swing away from the label but will be immediately returned to the position shown in Fig. 10 after the label has been positioned below the lugs, by the action of the weights 165.

From the foregoing specification it will be clear that simple, practical and effective mechanism has been designed for stacking the labels delivered from the cutting and folding means and that by the mechanism described the labels will be positively fed and accurately positioned in the box in which they are to be packed.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a machine of the character described, means for stacking folded labels comprising a pair of pivoted, positively actuated and positively controlled label gripping members, means for moving one member beneath the folded label, positively actuated means for moving the other member into engagement with the upper surface of the folded label, and means for swinging said members in unison to inverted discharge position.

2. In a machine of the character described, means for stacking folded labels comprising a pair of pivoted, positively actuated and positively controlled label gripping members, means for moving one member beneath the folded label, positively actuated means for moving the other member into engagement with the upper surface of the folded label, and means for swinging said members in unison through substantially 180° to inverted discharge position, thereby inverting the label.

3. In a machine of the character described, means for stacking labels comprising a pair of pivoted, positively actuated and positively controlled label gripping members, means for moving one member beneath the folded label, positively actuated means for moving the other member into engagement with the upper surface of the folded label, and means for swinging said members in unison to inverted discharge position.

4. In a machine of the character described, means for stacking labels comprising a pair of pivoted, positively actuated and positively controlled label gripping members, means for moving said members into gripping engagement with the label, means for swinging the members and label through substantially 180° to discharge position, and means for withdrawing said members from engagement with the label.

5. In a machine of the character described, means for stacking labels comprising a pair of pivoted, positively actuated and positively controlled label gripping members, means for moving said members into gripping engagement with the label, means for moving said members and label to inverted position and stacking the label.

6. In combination, means for supporting a folded label, a pair of coaxially pivoted and independently and positively controlled label gripping and transfer members, means for moving said members into gripping engagement with a label on said support, means for moving said members and label to inverted position, and means for withdrawing said members and returning the members to their initial position.

7. In combination, means for stacking labels comprising a pair of coaxially pivoted independently controlled label gripping members, means for moving one member beneath the folded label, means for moving the other member into engagement with the upper surface of the folded label, and means for swinging said members in unison to discharge position.

8. In combination, means for supporting a folded label, a reciprocatable carriage, means for reciprocating said carriage, a pair of label engaging and transfer fingers pivoted on said carriage, means operable during the movement of the carriage in one direction to move one finger beneath the label and means to move the other finger into engagement with the top of the label, and means operatable during the movement of the carriage in the opposite direction to swing the labels in unison to label discharging and stacking position.

9. In combination, means for supporting a folded label, a reciprocatable carriage, means for reciprocating said carriage, a pair of label engaging and transfer fingers pivoted on said carriage, means operable during the movement of the carriage in one direction to move one finger beneath the label and means to move the other finger into engagement with the top of the label, and means operatable during the movement of the carriage in the opposite direction to swing the labels in unison through substantially 180° to label discharging and stacking position.

10. In combination, means for supporting a folded label, a reciprocatable carriage, means for reciprocating said carriage, a pair of label engaging and transfer fingers pivoted on said carriage, means operable during the movement of the carriage in one direction to move one finger beneath the label and means to move the other finger into engagement with the top of the label, and means operatable during the movement of the carriage in the opposite direction to swing the labels in unison to label discharging and stacking position, said finger operating means including means mounted on and movable with the carriage for moving the fingers and stationary means for controlling said finger moving means.

11. In combination, means for supporting a folded label, a reciprocatable carriage, means for reciprocating said carriage, a pair of label engaging and transfer fingers pivoted on said carriage, means operable during the movement of the carriage in one direction to move one finger beneath the label and means to move the other finger into engagement with the top of the label, and means operatable during the movement of the carriage in the opposite direction to swing the labels in unison to label discharging and stacking position, said finger moving means including stationary cams and finger actuating members mounted on the carriage and engageable with the cams during the reciprocation of the carriage.

12. In combination, means for supporting a folded label and means for stacking the folded labels comprising a pair of label gripping members, means for moving one member beneath the folded label, means for moving the other member into engagement with the upper surface of the folded label, means for swinging said members in unison to discharge position, and means engageable with each label, as it is fed to discharge position, for feeding the label downwardly into a container.

13. In combination, means for supporting a folded label and means for stacking the folded labels comprising a pair of label gripping members, means for moving one member beneath the folded label, means for moving the other member into engagement with the upper surface of the folded label, means for swinging said members in unison to discharge position, means engageable with each label, as it is fed to discharge position, for feeding the label downwardly into a container, and means for holding the top label down after the operation of said last named feeding means.

14. In combination, means for supporting a folded label, a reciprocatable carriage, means for reciprocating said carriage, a pair of label engaging and transfer fingers pivoted on said carriage, means operable during the movement of the carriage in one direction to move one finger horizontally beneath the label and means to move the other finger into engagement with the top of the label, and means operatable during the movement of the carriage in the opposite direction to swing the labels in unison to label discharging and stacking position.

15. In combination, means for supporting a folded label and means for stacking the folded labels comprising a pair of label gripping members, means operable during one portion of the cycle of operation to move one finger beneath a label and to withdraw the other finger horizontally from the last label fed and means to move said other finger into engagement with the top of the label, and means operable in another portion of the cycle to swing the fingers in unison to label discharge position.

16. In combination, means for supporting a folded label and means for stacking the folded labels comprising a pair of label gripping members, means operable during one portion of the cycle of operation to move one finger horizontally beneath a label and to withdraw the other finger horizontally from the last label fed and means to move said other finger into engagement with the top of the label, and means operable in another portion of the cycle to swing the fingers in unison to label discharge position.

17. In combination, means for supporting a folded label, a reciprocatable carriage, means for reciprocating said carriage, a pair of label engaging and transfer fingers pivoted on said carriage, means operable during the movement of the carriage in one direction to move one finger beneath the label and to withdraw the other finger from beneath the label last fed and means to move said other finger into engagement with the top of the label to be fed, and means operatable during the movement of the carriage in the opposite direction to swing the labels in unison to label discharging and stacking position.

18. In combination, means for supporting a folded label, a reciprocatable carriage, means for reciprocating said carriage, a pair of label engaging and transfer fingers pivoted on said carriage, means operable during the movement of the carriage in one direction to move one finger horizontally beneath the label and to withdraw the other finger horizontally from beneath the label last fed and means to move said other finger into engagement with the top of the label to be fed, and means operatable during the movement of the carriage in the opposite direction to swing the labels in unison to label discharging and stacking position.

19. In combination, means for supporting a folded label and means for stacking the folded labels, said label supporting means and stacking means being arranged side by side in spaced relation, a pair of coaxially pivoted label gripping members, means operable during one portion of the cycle of operation to move one of said members horizontally beneath a label on the label supporting means, subsequently acting positively controlled mechanism to swing the other member over into engagement with the top of said label, and means operable in another portion of the cycle to swing said members in unison in the opposite direction from the label supporting means to the label stacking means.

EDWARD J. HUBELMEYER.